(12) United States Patent
Van Quekelberghe et al.

(10) Patent No.: US 7,022,013 B1
(45) Date of Patent: Apr. 4, 2006

(54) AXIAL FLOW COMBINE HARVESTER WITH ADAPTABLE SEPARATING UNIT

(75) Inventors: Eric P. J. Van Quekelberghe, Middelkerke (BE); Eric Cromheecke, Bredene (BE); Barry E. Lehman, York, PA (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/991,158

(22) Filed: Nov. 17, 2004

(51) Int. Cl.
*A01F 7/06* (2006.01)
*B02B 3/06* (2006.01)

(52) U.S. Cl. ...................................... 460/66
(58) Field of Classification Search ............... 460/25, 460/45, 46, 59, 66, 71, 72, 73, 79, 80, 81, 460/107–110, 119
See application file for complete search history.

(56) References Cited

U.S. PATENT DOCUMENTS

| | | | | |
|---|---|---|---|---|
| 325,671 A | * | 9/1885 | Gilman | 460/45 |
| 4,362,168 A | * | 12/1982 | Hengen et al. | 460/66 |
| 4,889,517 A | * | 12/1989 | Strong et al. | 460/66 |
| 4,936,810 A | * | 6/1990 | Strong et al. | 460/69 |
| 5,035,675 A | * | 7/1991 | Dunn et al. | 460/62 |
| 5,376,047 A | * | 12/1994 | Harden et al. | 460/121 |
| 6,027,407 A | * | 2/2000 | Roberg | 460/80 |
| 6,190,252 B1 | * | 2/2001 | Makeeff | 460/69 |
| 6,494,782 B1 | * | 12/2002 | Strong et al. | 460/71 |

* cited by examiner

*Primary Examiner*—Árpád Fábián Kovács
(74) *Attorney, Agent, or Firm*—Rebecca Henkel

(57) ABSTRACT

An axial flow combine harvester comprises a rotor having a separator section which can be adapted to suit different crops. Within the separator section staggered crop engaging elements are spaced from one another along a first helical crop flow path. The crop flow path can be modified to suit crops such as corn and sunflowers by attaching at least one separator blade to the rotor in place of or in addition to selected crop engaging elements of the rotor. The separator blade forms a continuous crop engaging surface defining a second helical crop flow path of greater pitch than the first path defined by the staggered strop engaging elements.

8 Claims, 5 Drawing Sheets

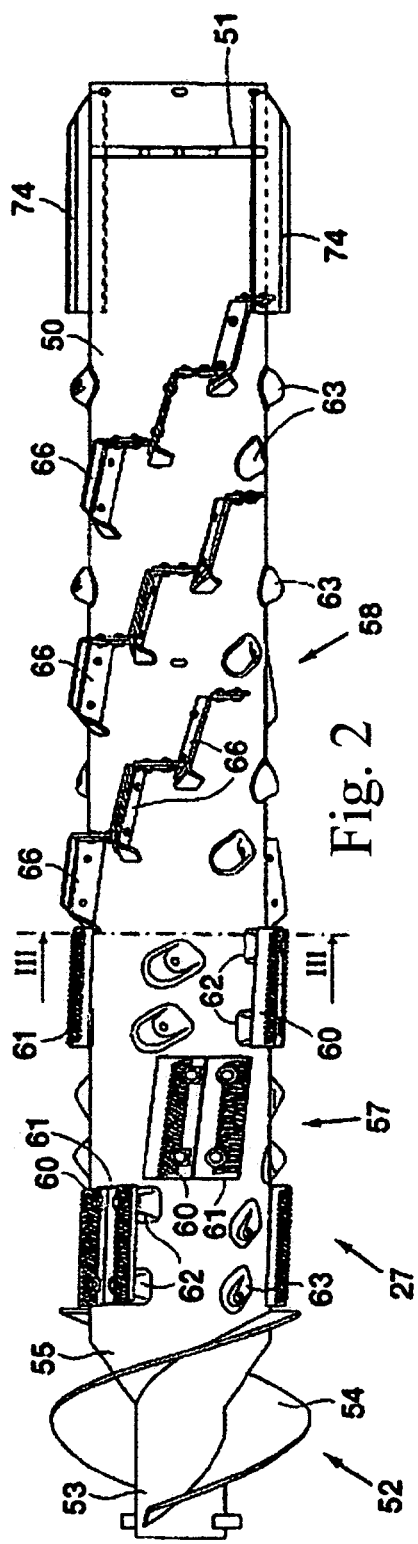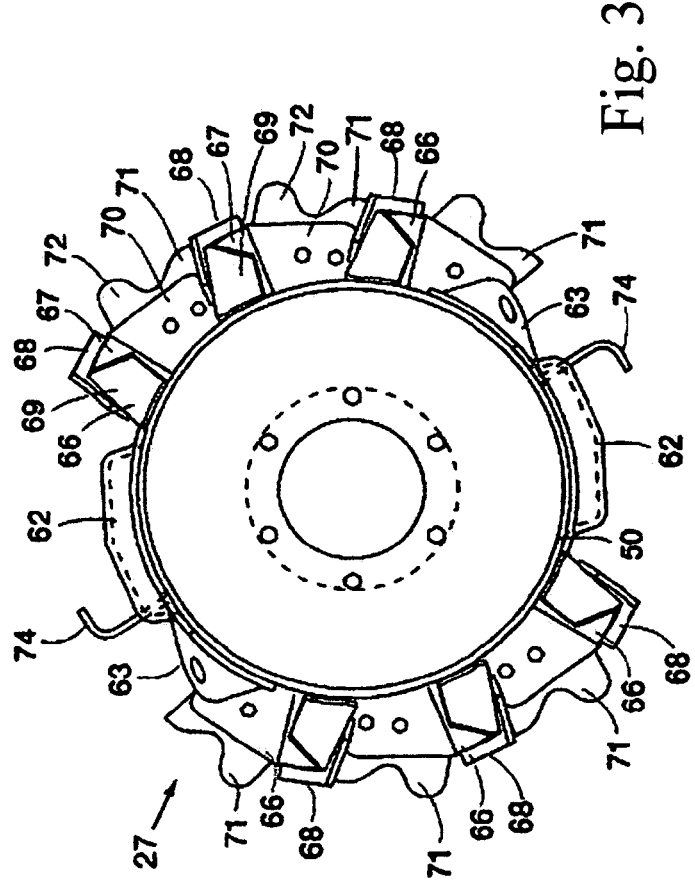

AXIAL FLOW COMBINE HARVESTER WITH ADAPTABLE SEPARATING UNIT

FIELD OF INVENTION

The present invention relates to agricultural harvesters and, more particularly, to axial flow combine harvesters having a threshing and separating unit with at least one generally longitudinally arranged rotor for advancing crop material along a generally helical path.

BACKGROUND OF INVENTION

In conventional combine harvesters crop material is fed between a threshing cylinder and an associated threshing concave, which extend transversely to the direction of combine travel. In this case, the crop is threshed over a comparatively short distance. Axial flow machines, on the other hand, use one or more longitudinally arranged rotors and associated concaves. Here, crop material is subjected to a much longer threshing and separating action than in a conventional machine and therefore, the efficiency of axial flow machines is greater because a higher degree of separation is reached and the grain losses are reduced. Commonly, axial flow combines are popular in regions with a continental climate, where the crops to be harvested ripen well and contain hardly any green parts at the time of the harvest. However, when the crop contains green material, such a unit is particularly prone to plugging by slugs of accumulated crop material between the rotor and the concaves.

Various means have been provided onto the rotor to optimise the crop flow along the rear portion of the threshing and separating unit and to improve the rotor performance under adverse conditions. U.S. Pat. No. 4,936,810, for example, proposes using thinning elements in the form of generally radially extending fingers to smoothen the layer of crop material which is advancing along the concaves. The fingers co-operate with conventional longitudinal bars on the rotor body to move the crop layer along a helical path and to loosen the same. This system is still optimal when harvesting dry crops, but too often slugs occur when handling greener material.

U.S. Pat. No. 5,376,047 discloses a rotor equipped with a multitude of rectangular blades which can be distributed along the surface of the rotor in order to optimise the crop flow. For a particular crop and a particular crop condition, a blade distribution may be found which is optimal with respect to threshing and separating efficiency and/or plugging risks, but such experimentation is not within reach of the ordinary operator.

In U.S. Pat. No. 4,178,943 a rotor is shown equipped with generally transverse fins behind the threshing section. The separation capacity of this embodiment is limited because of the restrained action of the fin heads on the layer of crop material. The grain losses at the end of the separation section may raise to unacceptable levels, unless the rate of incoming material is reduced by lowering the ground speed of the combine harvester.

SUMMARY OF INVENTION

The Applicants' earlier U.S. Pat. No. 6,494,782 B1, of which the present invention is an improvement, discloses an axial flow combine harvester comprising a threshing and separating arrangement mounted on a main frame and including a cylindrical chamber having a longitudinal axis. The chamber comprises a separating concave assembly and a rotor assembly mounted for rotation in the chamber. The rotor has a generally cylindrical body with a separating section associated with the separating concave assembly, which section comprises a plurality of elements having a leading, generally longitudinally arranged crop engaging face and a plurality of transverse elements having a generally transversely arranged crop engaging edge.

The rotor of the latter patent has proved very successful with small grains but it is prone to the formation of plugs in the separating section when used to harvest certain crops, such as corn and sunflowers, which do not require such an aggressive separating action.

The present invention seeks to provide a rotor which is capable of being modified simply to suit different crops.

According to the present invention, there is provided an axial flow combine harvester, comprising a rotor having a separator section within which staggered crop engaging elements are spaced from one another along a first helical crop flow path, wherein at least one separator blade is provided which is attachable to the rotor in place of or in addition to selected crop engaging elements of the rotor to form a continuous crop engaging surface defining a second helical crop flow path of greater pitch than the first path defined by the staggered crop engaging elements.

BRIEF DESCRIPTION OF DRAWINGS

The invention will now be described further, by way of example, with reference to the accompanying drawings, in which:

FIG. 2 is an enlarged side view of one of the rotors of the threshing and separating unit of FIG. 1;

FIG. 3 is cross sectional view of the rotor, taken along line III—III of FIG. 2;

FIGS. 1 to 3 are the same as those of U.S. Pat. No. 6,494,782 and are included herein together with their description to provide a clear explanation of the background to the present invention.

DETAILED DESCRIPTION OF THE PREFERRED EMBODIMENT

The terms "grain", "straw" and "tailings" are used principally throughout this specification for convenience at it is to be understood that these terms are not intended to be limiting. Thus "grain" refers to that part of the crop material which is threshed and separated from the discardable part of the crop material which is referred to as "straw". Incompletely threshed crop material is referred to as "tailings".

Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
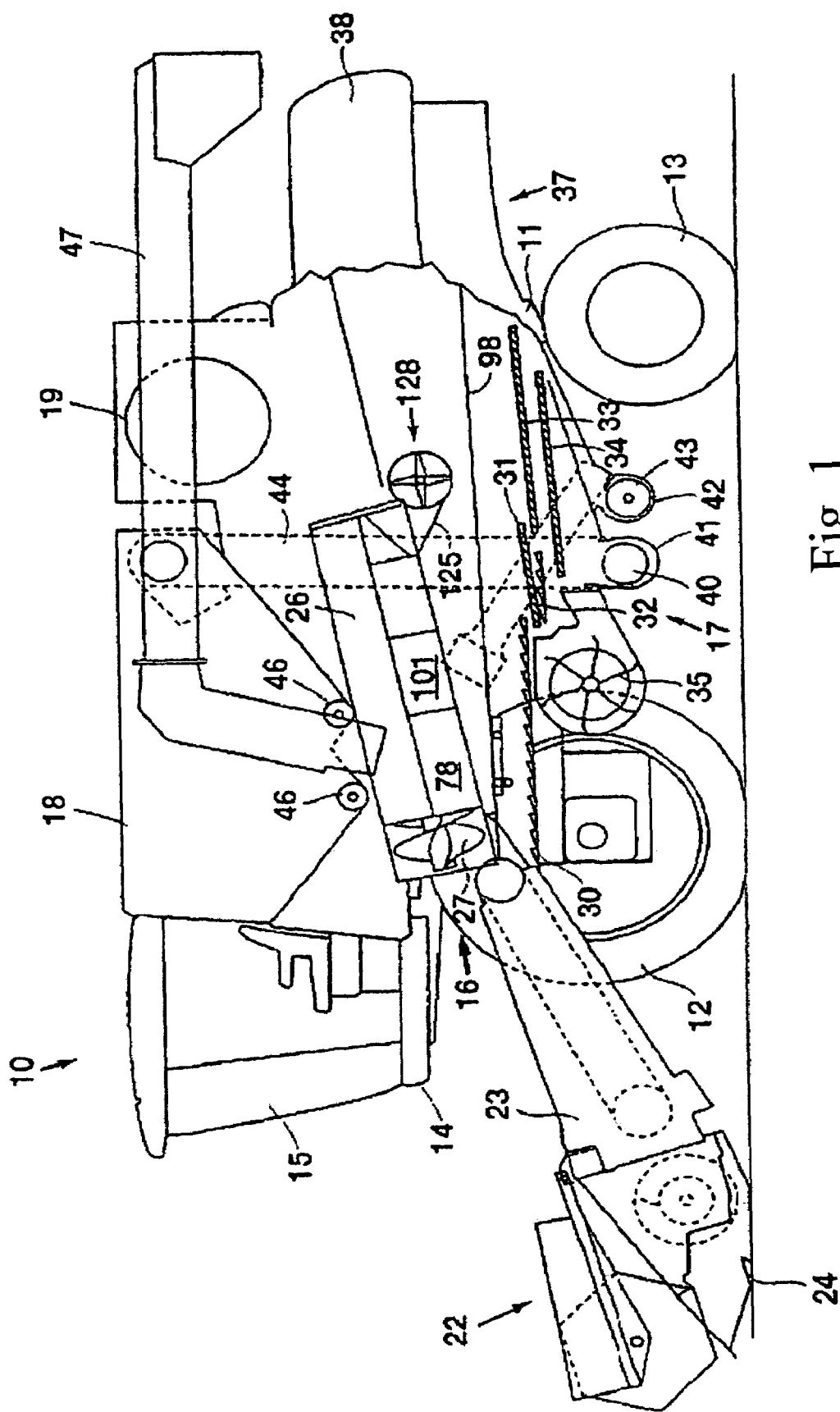
FIG. 1 is a diagrammatic, partly sectional side view of a combine harvester having an axial flow threshing and separating unit.

The combine harvester 10 shown in FIG. 1 of the accompanying drawings, is of the axial-flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional header 22 and straw elevator 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22. Thereafter the header and the straw elevator 23 supply the cut crop to the threshing and separating assembly 16.

The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner surfaces of the chambers 26, whereby the grain, seed or the like, is loosened and separated from the straw. The chambers and the rotors are described in further detail hereinafter.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor to the cleaning assembly 17 for repeated cleaning action.

A pair of grain tank augers 46 at the bottom of the grain tank 18 is used to urge the clean grain sideways to an unloading tube 47 for discharge from the combine harvester 10.

The rotors 27 of the threshing and separating assembly 16 are mirror images of each other. The left-hand rotor 27, which is shown in FIGS. 2 and 3, is rotated by appropriate means (not shown) in a counter-clockwise direction as seen from the front of the combine harvester 10. The right-hand rotor is rotated in the opposite sense. The main body 50 of each rotor 27 is constituted by a cylindrical tube mounted on discs 51 which are supported on front and rear stub shafts (not shown). The front end of the rotor is provided with an infeed section 52 having a cylindrical tube portion 53 of reduced diameter and a conical tube portion 55 which provides a transition between the portion 53 and the main body 50 of the rotor. A pair of auger flights 54 is welded to the infeed section of each rotor and serves to transfer crop material from the rear end of the straw elevator 23 to the left and right threshing and separating chambers 26.

Each rotor 27 has a threshing section 57, immediately following the infeed section 52, and the threshing section is followed by a separating section 58. The threshing section 57 has a plurality of rasp bars 60, 61 bolted onto rasp bar mounts 62 which are provided at predetermined positions around the periphery of the threshing section 57. The rasp bar mounts are arranged in pairs for fastening a leading rasp bar 60 and a trailing rasp bar 61 to each pair of mounts 62. Also further mounts 63 are provided at predetermined positions both in the threshing section 57 and the separating section 58. These further mounts can be used for mounting thinning rods (not shown) to the rotor 27.

Further details on the configuration of the mounts 62, 63 and the rasp bars 60, 61 can be taken from U.S. Pat. No. 4,889,517, column 3, line 31 to column 7, line 15, incorporated herein by reference.

The separating section 58 of the rotor 27 has several sets of supports 66 for crop engaging elements, which supports are welded at predetermined positions to this separating section 58. Each set comprises three supports 66 which are arranged along helical paths on the rotor body 50. Accordingly the second and third supports 66 are staggered with respect to the first and second support, respectively. The supports 66 are made out of sheet material and generally take the shape of an inverted U with the legs extending rearwardly with respect to the normal crop flow.

The front section 69 of the supports 66 is almost perpendicular to the cylindrical surface of the rotor 27. The surface of this section 69 is inclined slightly rearwardly and its outer edge is sloping inwardly towards the rotor surface.

The middle section 67 of each support 66 is oriented in a generally longitudinal direction. It is positioned at an acute angle (in the range of 12°) to the axis of rotor 27 for better matching the helical flow of the straw and other crop material along the confines of the chamber 26. The surface of the middle section 67 extends from the rotor surface and its leading face is inclined rearwardly with respect to the direction of rotation of the rotor 27. The face may be positioned at an angle of about 75° to the surface of the tube 50. Each middle section 67 has a pair of mounting holes for attaching to its leading face a wear plate 68 of a generally rectangular shape. The wear plates 68 have a front edge which is inclined outwardly and rearwardly to match the plane of the adjacent front section 69 and an outer edge which extends beyond the outer edge of the support 66. Because of their backwards inclined orientation (about 15°), the leading faces of the wear plates 68 tend to force the crop material outwardly against the confines of the cylindrical chamber 26.

The supports 66 further have rear sections 70 which extend from the rear ends of the middle sections 67 in a direction which is generally transverse to the axis of the rotor 27, at an angle of about 87° thereto. In each set of three supports 66, the rear ends of the first and second sections 70 terminate short of the front ends of the middle sections of the second and third support 66, respectively. The plane of the rear sections 70 is generally perpendicular to the surface of tube 50. Each section 70 is provided with a pair of mounting holes for attaching thereto a wear finger plate 71. These plates 71 also have leading edges which are inclined backwards, thereby matching the plane of the longitudinal wear plates 68. At its leading end, each finger plate 71 has a curved protrusion 72 extending beyond the support 66 and constituting the most outward part of the separating section 58 of the rotor 27. The middle portion of the plate 71 is curved inwardly and its trailing portion has a substantially straight edge, parallel to the rotor tube 50 and ending short of the front face of the next, longitudinal wear plate 68. The protrusions 72 engage the crop flow inside the chamber and have a thinning and splitting effect thereupon. Consequently the chances for "roping" of the straw and the consequent blocking of the rotors 27 are reduced substantially by the dedicated outer profile of the wear finger plate 71. This is especially effective under circumstances where the stems of the crop material still contain some humidity.

The thinning effect of the rotor 27 can be enhanced even further by mounting thinning rods (not shown) to the mounts 63 which are distributed between the supports 66. These rods extend perpendicularly from the flat surfaces of mounts 63 which are inclined in two planes so as to impart a trailing angle and a rearward angle for each thinning rod. The trailing angle is defined with respect to the radius of the rotor 27 passing through the bottom end of the rod on the one hand and may be about 30°. The rearward angle is defined as the angle between the rod and the diametral plane of the rotor passing through the same bottom end and may be 32°. The overall orientation of the rods forces the crop material outwardly while their tips smoothen the layer along the inner surface of the chamber 26.

Near their rear ends the rotors 27 are provided with a pair of longitudinally arranged paddles 74. These paddles extend perpendicularly from the rotor tube 50 and assist in discharging the straw from the threshing and separating assembly 16.

The rotor as shown in FIG. 3 has been used in combines suitable to harvest both small grain and corn. While the helically staggered crop engaging elements of the separator section have been found to work efficiently with small grain, they work less well when harvesting corn and sunflowers because their separating action is too aggressive. Other known rotors that have a continuous helical blade, of greater pitch than the helix of the staggered elements, have been found to operate more successfully under such conditions. Hence to optimise operation under all conditions, it has hitherto been necessary to change the rotors, which is costly and time consuming.

Instead of changing rotors, the present invention allows the same rotor to be adapted simply, as will now be described with reference to FIGS. 4 and 5, to suit the type of crop being harvested. The modification to the rotor can be made without having to remove it from the combine harvester, it being only necessary to access the separator section of the rotor by removal of the surrounding concave assembly.

Figure 4:
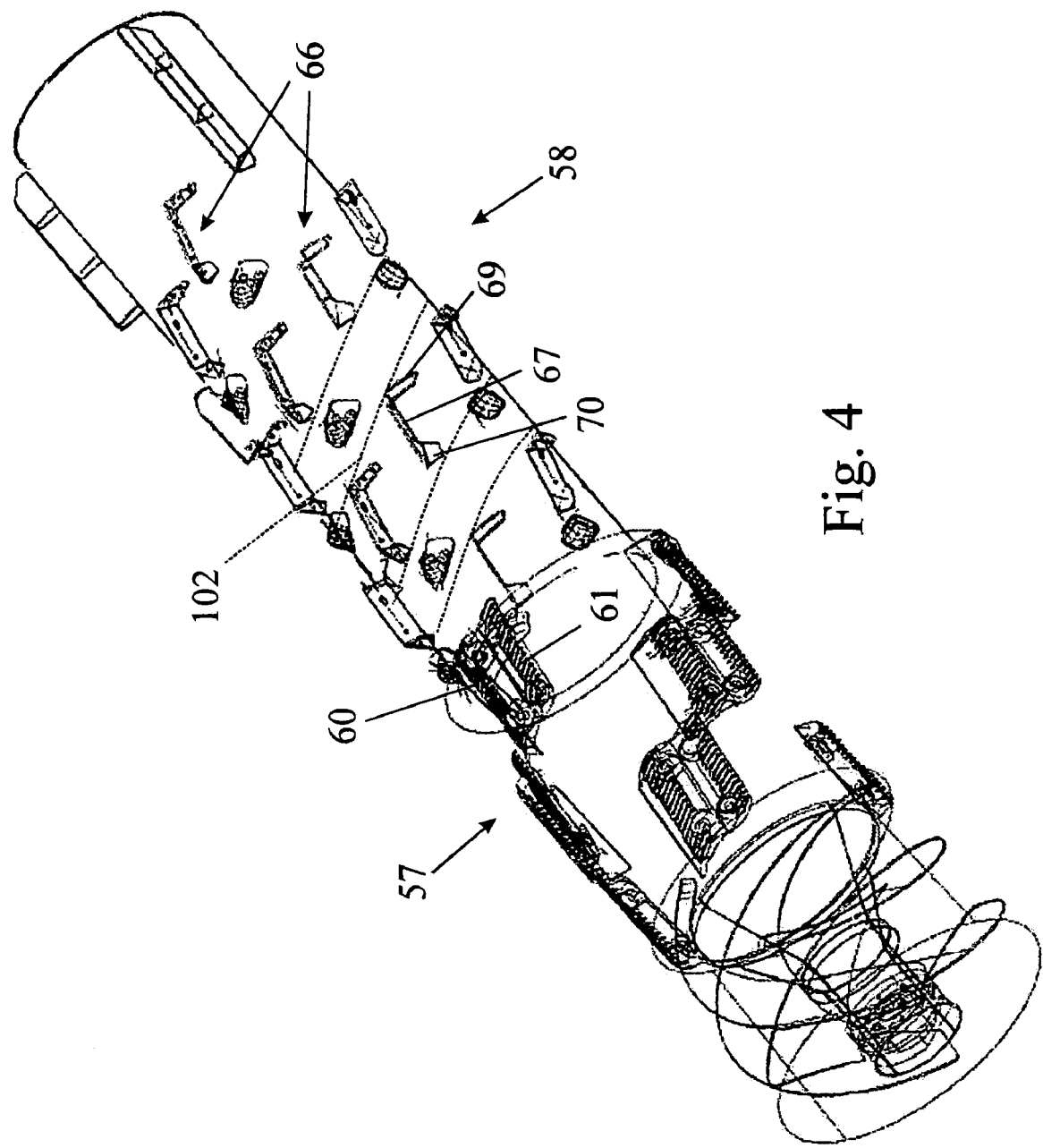
FIG. 4 shows an alternative design of rotor in which the layout of the supports of the crop engaging elements in the separator section has been modified from that shown in FIG. 2, to permit attachment of a continuous separator blade.

In FIG. 4, there is shown a rotor similar in operation to the rotor of FIG. 2 but in which the layout of the support brackets 66 has been modified to enable implementation of the present invention. As in the rotor of FIG. 3, the supports 66 for the crop engaging element are staggered about a helical crop flow path of relatively small pitch as represented by dotted lines 102. The small pitch of the helical path means that the crop makes several turns around the rotor and this makes the separating action too aggressive for such crops as corn and sunflowers.

The spacing of the support brackets 66 along the helical path 102 in FIG. 4 is significantly greater than the spacing of the brackets 66 in the rotor of FIG. 2. When a separator blade 104 is attached to selected brackets 66 as shown in FIG. 5, a helical crop flow path of greater pitch, represented by dotted line 106, is defined which achieves less aggressive separation and reduces the risk of plugging.

Figure 5:
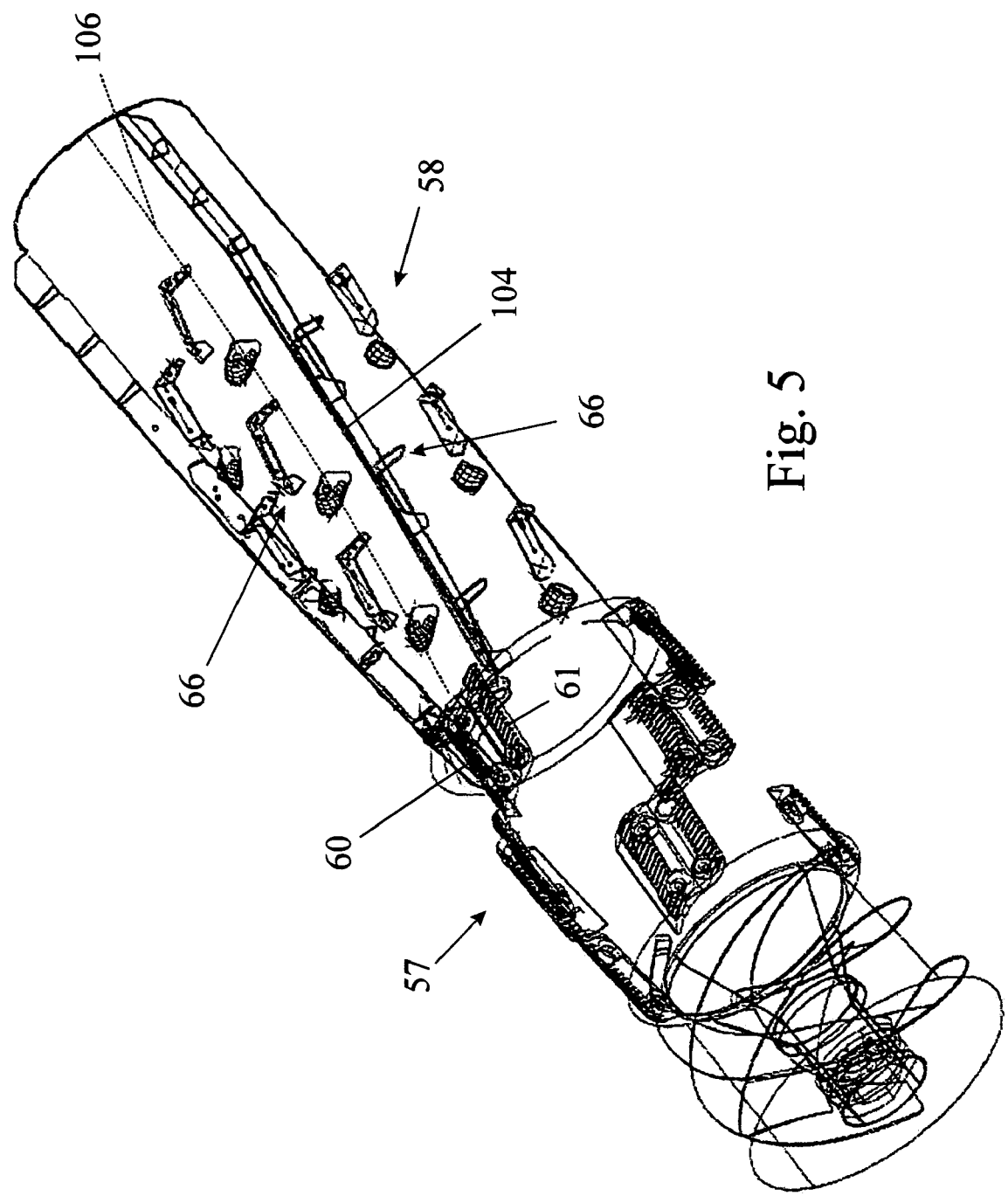
FIG. 5 shows the rotor of FIG. 4 when fitted with a continuous separator blade.

The rotor of FIGS. 4 and 5, is intended to function in the same way as the rotor of FIG. 2 when the separator blade 104 is not present. For this reason, it is desirable for the staggered crop engaging elements to have front sections 69 and rear sections 70 as earlier described with reference to FIGS. 2 and 3, to direct the crop along the first helical crop flow path 102. However these sections 69 and 70 must be spaced from another to allow the crop to flow along the second path 106 when the separator blade 104 is in place.

The separator blade 104 is preferably a single blade extending over the separator section of the rotor mounted in place of the wear plates. To enable this, it is preferable for the middle sections 67 of the separator brackets to be aligned along the second helical flow path 106 but alternatively, wedge-like brackets be used to secure the separator blade 104 to the selected brackets 66.

Instead of removing the wear plates 68 and fitting a single continuous blade 104, it would be alternatively possible to leave the wear plates 68 on the brackets and to form the separator blade of several segments that each mounted to two brackets 66. These segments may mate with one another or with the wear plates form a single continuous surface defining the second crop flow path 106.

In the same way as it is necessary to adapt the separator section 58 of the rotor to suit different crops, it is also desirable to modify the thresher section 57. The rasp bars 60, 61 of the rotor shown in FIG. 2 are arranged in pairs and it is possible to render the threshing section less aggressive by removing the second or trailing rasp bar 61 from all or selected pairs. It has been found, however, that removal of the second rasp bar 61 can result under certain conditions in an uneven crop flow into the infeed of the separator section 58 causing the rotor to plug up, especially when using the continuous spiral blade 104 in the separator section.

Figures 6, 7:
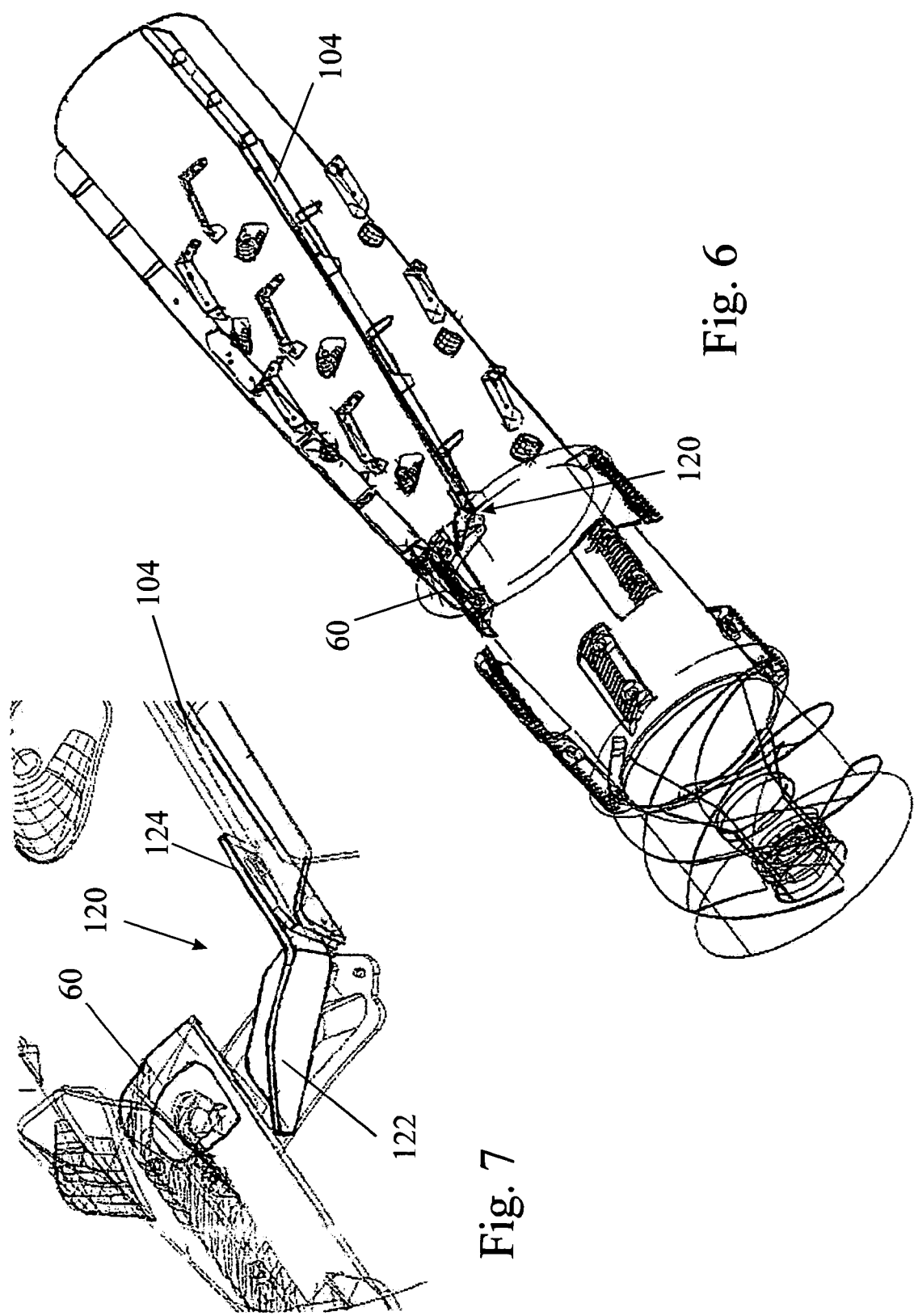
FIG. 6 shows the rotor of FIG. 5 in which some of the rasp bars have been removed from the thresher section of the rotor to render the threshing section less aggressive.
FIG. 7 shows a detail of the rotor of FIG. 6 drawn to enlarged scale illustrating a crop flow deflector position in lieu of one of the removed rasp bars to improve crop flow and reduce the risk of the crop being wound around the rotor and creating a blockage.

As is shown in FIGS. 6 and 7, this problem can be overcome in a preferred embodiment of the invention by placing flow deflector plate 120 in the position of the removed rasp bar 61. Such a flow deflector plate 120 has been found to reduce the risk of plugging and to reduce rumbling noise from the rotor. It has also been found to lower the power consumption of the rotor, increase throughput capacity and reduce MOG separation.

The deflector plate is shaped to guide the crop flow continuously from the remaining rasp bar 60 to the infeed end of the separator section 58. In particular, the flow deflector plate 120 has a first section 122 extending generally tangentially with respect to the rotor in line with the serrations of the rasp bars and a second section 124 deflecting the crop to follow a continuous helical path towards the infeed end of the separator section 58. The height of the second section 124 should be the same as that of the separator blade 104 while the height of the first section is ramped to rise from the height of the rasp bars to reach the height of the separator blade 104 midway along its length.

The invention claimed is:

1. An axial flow combine harvester, comprising a rotor having a separator section configured to receive a crop material from a threshing section, the separator section including staggered crop engaging elements spaced from one another along a first helical crop flow path, wherein at least one separator blade is provided which is attached to the rotor in place of one or more selected removed crop engaging elements of the rotor to form a continuous crop engaging surface defining a second helical crop flow path of greater pitch than the first path defined by the remaining staggered crop engaging elements.

2. A combine harvester as claimed in claim 1, wherein the staggered crop engaging elements are secured to support brackets that project radially from the rotor, each support bracket being generally U-shape and having at least a front or a rear section directing the crop flow along the first flow path and a middle section aligned along the second flow path.

3. A combine harvester as claimed in claim 2, wherein the crop engaging elements are formed by wear plates secured to the middle sections of the support brackets.

4. A combine harvester as claimed in claim 3, wherein the separator blade is formed of a single blade mounted to selected support brackets in lieu of the wear plates.

5. A combine harvester as claimed in claim 3, wherein the separator blade is formed of several segments each mounted between two support brackets, the segments mating with one another or with the wear plates form a single continuous surface defining the second crop flow path.

6. A combine harvester, comprising:
a rotor having a separator section within which staggered crop engaging elements are spaced from one another along a first helical crop flow path, wherein at least one separator blade is provided which is attachable to the rotor in place of or in addition to selected crop engaging elements of the rotor to form a continuous crop engaging surface defining a second helical crop flow path of greater pitch than the first path defined by the staggered crop engaging elements, wherein the rotor has a thresher section having pairs of rasp pars staggered from one another along a further helical path, wherein individual rasp bars of at least the pairs of rasp bars adjoining the separator section of the rotor are removable to render the action of the thresher section less aggressive, and wherein a flow deflector plate is provided for mounting in the position of a removed rasp bar to guide the crop flow continuously from the remaining rasp bar to the infeed end of the separator section.

7. A combine harvester as claimed in claim 6, wherein the flow deflector plate has a first section extending generally tangentially with respect to the rotor in line with serrations of the remaining rasp bar and a second section deflecting the crop to follow a helical path towards the infeed end of the separator section.

8. A combine harvester as claimed in claim 7, wherein the height of the second section of the deflector plate is of the same radial height as the crop engaging blade(s) in the separator section of the rotor and the height of the first section of the deflector plate is ramped from the height of the remaining rasp bar to the height of the second section.

* * * * *